(12) United States Patent
Kobayashi

(10) Patent No.: US 7,057,825 B2
(45) Date of Patent: Jun. 6, 2006

(54) PROJECTION LENS SYSTEM AND PROJECTOR

(75) Inventor: Kiwamu Kobayashi, Suwa (JP)

(73) Assignee: Nittoh Kogaku K.K., Suwa (JP)

( * ) Notice: Subject to any disclaimer, the term of this patent is extended or adjusted under 35 U.S.C. 154(b) by 77 days.

(21) Appl. No.: 10/766,510

(22) Filed: Jan. 28, 2004

(65) Prior Publication Data
US 2005/0195490 A1  Sep. 8, 2005

(30) Foreign Application Priority Data
Jan. 30, 2003  (JP) ............................. 2003-021540

(51) Int. Cl.
G02B 9/12 (2006.01)
G02B 13/04 (2006.01)
G02B 13/18 (2006.01)

(52) U.S. Cl. .................... 359/651; 359/716; 359/753; 359/784

(58) Field of Classification Search ........ 359/749–753, 359/649–651, 716, 784
See application file for complete search history.

(56) References Cited

U.S. PATENT DOCUMENTS

| 5,625,495 A | * | 4/1997 | Moskovich | ............... 359/663 |
| 5,841,587 A | | 11/1998 | Moskovich | |
| 5,900,987 A | | 5/1999 | Kreitzer | |
| 6,317,269 B1 | * | 11/2001 | Yamamoto | ............... 359/651 |
| 6,587,279 B1 | | 7/2003 | Narimatsu et al. | |
| 2002/0018301 A1 | | 2/2002 | Narimatsu et al. | |

FOREIGN PATENT DOCUMENTS

JP        2002-031754        1/2002

* cited by examiner

Primary Examiner—Scott J. Sugarman
(74) Attorney, Agent, or Firm—Thompson Hine LLP (57) ABSTRACT

A projection lens system that projects projected light from a light modulator to a screen, comprising in order from a screen side: a first lens group with a negative refractive power; a second lens group with a positive refractive power; and a third lens group with a positive refractive power is provided. The third lens group includes at least two cemented lenses and a lens with a positive refractive power positioned on an opposite side of the cemented lenses to the screen. Since the projection lens system achieves a sufficiently high correcting performance for various aberrations using fewer aspherical lenses, it is suitable lens system for a rear projector with high image quality.

6 Claims, 7 Drawing Sheets

| No. | R | D | Nd | νd | Lens |
|---|---|---|---|---|---|
| 1 | 36.235 | 3.50 | 1.492 | 58.0 | lens L11 |
| 2 | 25.736 | 8.50 | | | |
| 3 | 37.915 | 2.50 | 1.713 | 53.9 | lens L12 |
| 4 | 14.271 | 9.33 | | | |
| 5 | 100.685 | 1.80 | 1.743 | 49.2 | lens L13 |
| 6 | 21.999 | 12.66 | | | |
| 7 | −24.075 | 5.97 | 1.805 | 25.5 | lens L21 |
| 8 | −23.155 | 0.50 | | | |
| 9 | 21.759 | 6.23 | 1.62 | 36.3 | lens L22 |
| 10 | 858.316 | 19.16 | | | |
| 11 | INF | 2.04 | | | stop ST |
| 12 | −41.390 | 3.42 | 1.658 | 50.9 | lens L31 |
| 13 | −7.274 | 1.60 | 1.805 | 25.5 | lens L32 |
| 14 | −32.705 | 5.86 | | | |
| 15 | −45.243 | 1.60 | 1.847 | 23.8 | lens L33 |
| 16 | 21.892 | 7.50 | 1.517 | 64.2 | lens L34 |
| 17 | −19.140 | 0.30 | | | |
| 18 | 48.275 | 5.23 | 1.805 | 25.5 | lens L35 |
| 19 | −32.597 | 6.00 | | | |
| 20 | INF | 21.00 | 1.517 | 64.2 | glass FG1 |
| 21 | INF | 2.00 | | | |
| 22 | INF | 3.00 | 1.487 | 70.4 | glass FG2 |
| 23 | INF | 0.56 | | | |

| No. | R | D | Nd | νd | Lens |
|---|---|---|---|---|---|
| 1 | 42.017 | 4.00 | 1.492 | 58.0 | lens L11 |
| 2 | 26.620 | 9.87 | | | |
| 3 | 52.745 | 2.50 | 1.713 | 53.9 | lens L12 |
| 4 | 15.254 | 10.16 | | | |
| 5 | −75.001 | 1.80 | 1.743 | 49.2 | lens L13 |
| 6 | 22.288 | 9.18 | | | |
| 7 | 44.255 | 6.63 | 1.729 | 28.3 | lens L21 |
| 8 | −40.727 | 1.00 | | | |
| 9 | 266.326 | 2.44 | 1.581 | 10.9 | lens L22 |
| 10 | 502.504 | 29.39 | | | |
| 11 | INF | 5.21 | | | stop ST |
| 12 | 82.982 | 4.41 | 1.487 | 70.4 | lens L31 |
| 13 | −12.056 | 2.93 | 1.847 | 23.8 | lens L32 |
| 14 | −27.657 | 1.00 | | | |
| 15 | −73.967 | 1.60 | 1.847 | 23.8 | lens L33 |
| 16 | 31.064 | 7.42 | 1.487 | 70.4 | lens L34 |
| 17 | −21.620 | 1.00 | | | |
| 18 | 45.856 | 4.44 | 1.847 | 23.8 | lens L35 |
| 19 | −55.706 | 3.33 | | | |
| 20 | INF | 26.00 | 1.517 | 64.2 | glass FG1 |
| 21 | INF | 2.00 | | | |
| 22 | INF | 3.00 | 1.487 | 70.4 | glass FG2 |
| 23 | INF | 0.51 | | | |

| No. | R | D | Nd | νd | Lens |
|---|---|---|---|---|---|
| 1 | 45.959 | 3.50 | 1.492 | 58.0 | lens L11 |
| 2 | 28.055 | 10.29 | | | |
| 3 | 43.271 | 2.50 | 1.713 | 53.9 | lens L12 |
| 4 | 15.067 | 7.51 | | | |
| 5 | -134.747 | 1.80 | 1.743 | 49.2 | lens L13 |
| 6 | 23.786 | 14.11 | | | |
| 7 | -54.520 | 4.13 | 1.673 | 32.2 | lens L21 |
| 8 | -32.599 | 0.20 | | | |
| 9 | 23.882 | 6.50 | 1.648 | 33.8 | lens L22 |
| 10 | -386.957 | 15.81 | | | |
| 11 | INF | 4.32 | | | stop ST |
| 12 | -27.534 | 3.53 | 1.487 | 70.4 | lens L31 |
| 13 | -9.270 | 1.60 | 1.847 | 23.8 | lens L32 |
| 14 | -20.581 | 2.00 | | | |
| 15 | -45.337 | 1.60 | 1.847 | 23.8 | lens L33 |
| 16 | 60.855 | 5.89 | 1.497 | 81.6 | lens L34 |
| 17 | -23.265 | 0.20 | | | |
| 18 | 200.000 | 4.63 | 1.497 | 81.6 | lens L35 |
| 19 | -31.777 | 0.20 | | | |
| 20 | 88.467 | 4.70 | 1.847 | 81.6 | lens L36 |
| 21 | -46.795 | 4.00 | | | |
| 22 | INF | 26.00 | 1.5168 | 64.2 | glass FG1 |
| 23 | INF | 2.00 | | | |
| 24 | INF | 3.00 | 1.487 | 70.4 | glass FG2 |
| 25 | INF | 0.51 | | | |

Fig. 10

PROJECTION LENS SYSTEM AND PROJECTOR

BACKGROUND OF THE INVENTION

1. Technical Field

The present invention relates to a projection lens system of a projector that enlarges and projects an image displayed by a light modulator, such as a liquid crystal panel or DMD, onto a screen.

2. Description of the Related Art

Japanese Laid-Open Patent Publication No. 2002-31754 discloses a projection-type image display apparatus that modulates light from a light source in pixel units by transmitting the light using a liquid crystal display device or reflecting the light using a micromirror device (DMD) and then enlarging and projecting the modulated light using a projection lens apparatus so as to produce a visual image.

The projection lens apparatus disclosed by Japanese Laid-Open Patent Publication No. 2002-31754 includes an arrangement of a first lens group with a negative refractive power, a second lens group with a positive refractive power, and a third lens group with a positive refractive power that are disposed in this order from a screen-side towards an image display element side. The publication states that by using aspherical lenses in the first lens group, the second lens group, and the third lens group, distortion and chromatic aberration of magnification are corrected by the first and third lens groups and aberration of rays on the optical axis is corrected by the second lens group, so that it is possible to favorably control various aberrations while reducing apparatus size and widening the projection angle.

Figure 1:
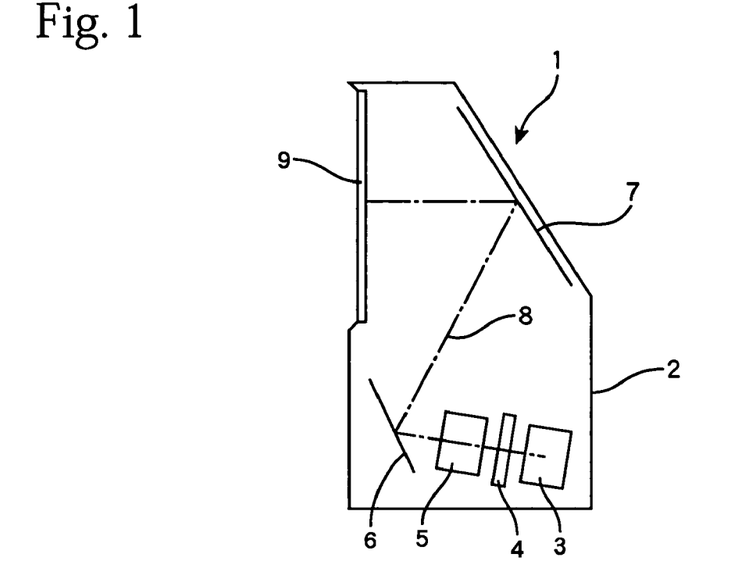
FIG. 1 shows an arrangement of a rear projector.

A retrofocus-type projection lens system having a first lens group with a negative refractive power and second and third lens groups with a positive refractive power can construct a telecentric optical system that is wide angle and has a long back focus, and so is suited to a projection lens system of a rear projector such as that shown in FIG. 1. However, when a lens system is made wide-angle, it becomes difficult to correct distortion, curvature of field, and astigmatism. In particular, it is problematic to correct the distortion, curvature of field, and spherical aberration for a retrofocus lens system for a wide-angle lens. Accordingly, the projection lens apparatus disclosed by Japanese Laid-Open Patent Publication No. 2002-31754, attempts to favorably correct aberration by using aspherical lenses in the first lens group, the second lens group, and the third lens group, respectively.

By using aspherical lenses, aberration can be favorably corrected using a low number of lenses. However, there are the problems that aspherical lenses are expensive and are easily affected by minute expansions and/or contractions in the lens surfaces due to changes in temperature. Additionally, aberration performance is greatly affected by the precision of the lens surfaces during manufacturing. Accordingly, increasing the number of aspherical lenses makes a lens system costly. At the same time, when fluctuations in the aberration performance of a plurality of aspherical lenses cannot be cancelled out, such a lens system will be easily affected by temperature changes and/or a performance of such a lens system becomes fluctuate.

In a rear projector such as that shown in FIG. 1, the projection lens system is disposed in a completely closed environment, and compared to a conventional screen and projector system where at least part of the lens system is exposed, such projection lens system is susceptible to the effects of heat. The rear projector 1 shown in FIG. 1 includes, inside a housing 2, a light source 3, a light modulator (light valve) 4 that modulates light from the light source according to an image signal to form an image, a projection lens system 5 that projects projected light 8 from the light valve 4 onto a screen 9 via a rear surface, and mirrors 6 and 7 that guide the projected light 8 to the screen 9. A CRT, in which the light source 3 and the light valve 4 are integrated, can be also used. In recent years liquid crystal panels have often been utilized as the light valve 4, and DMD panels, formed of the micromirrors mentioned above, are also utilized. In the case of a DMD panel or a reflective type LCD, the light valve 4 is a reflective-type, so that the positional relationship with respect to the light source 3 differs to that shown in FIG. 1. Anyway the input side of the projection lens system 5 will be telecentric regardless of whether a liquid crystal panel or a DMD panel is used as the light valve 4. Therefore, a projection lens system 5 that input side is telecentric and enlarges and projects the modulated light (projected light) 8 is required.

It is an object of the present invention to provide a projection lens system whose input side is telecentric, which enlarges and projects modulated light, and has a similar or higher aberration correction performance in spite of making the greatest possible reduction in the number of aspherical lenses.

SUMMARY OF THE INVENTION

In the present invention, a system of retrofocus-type that has negative, positive, and positive refractive powers in this order from the screen side and is suited to enlarging and projecting images is utilized, and two cemented lenses are included in a third lens group. With this arrangement, a low-cost, high-performance lens system in which aberrations such as distortion are corrected using a low number of aspherical lenses and which is not easily affected by temperature can be provided. That is, a projection lens system according to the present invention projects projected light from a light modulator to a screen, and includes in order from a screen side: a first lens group with a negative refractive power; a second lens group with a positive refractive power; and a third lens group with a positive refractive power. In addition, the third lens group includes at least two cemented lenses and a lens with a positive refractive power positioned on an opposite side of the cemented lenses to the screen.

A cemented lens, such as cemented doublet lens generates both positive and negative aberrations that cancel out, and makes it easy to correct spherical aberration. Therefore, a cemented lens is suited to correcting spherical aberration which commonly occurs in retrofocus-type lens system. It is possible to improve the correction performance for spherical aberration by increasing the number of cemented lenses. In addition, in the projection lens system, from the point of views of the arrangement of the second and third lens groups, in order from the opposite side to the screen, a lens with the positive refractive power, two cemented lenses (those are the third lens group), and a positive refractive power of the second lens group are arranged and producing a similar construction of the lens combination known as a Gaussian-type. A Gaussian-type lenses arrangement (hereinafter a Gaussian-type) is a symmetric lens arrangement where various aberrations becomes low and it is easy to achieve a favorable balance between different aspects of system performance, making the arrangement suited to lens systems with wide field angles. In addition, since a Gaussian-type can correct various aberrations without using a combination of lenses in which there is a large variation in curvature, the fabrication of parts and assembly are easy even when there is a large number of lenses. A Gaussian-type is also a low-ghost lens arrangement.

An arrangement of the lens system of the present invention can be explained that the lens system has a Gaussian-type on the input side and a first lens group with a negative refractive power on the output side. In addition, by designing the Gaussian-type combination as a positive second lens group and a positive third lens group, it is possible to provide a projection lens system with high performance that has an overall retrofocus construction and is telecentric on the input side.

Accordingly, the projection lens system according to the present invention and having an aspherical lens as the first lens positioned closest to the screen in the first lens group achieves sufficient image forming performance for the projection lens system without aspherical lenses in the second and third lens groups. It becomes possible to provide a low-cost projection lens system which is not susceptible to the effects of heat by this invention. By using two cemented lenses with one aspherical lens, not only spherical aberration and distortion can be favorably corrected, but also chromatic aberration, coma aberration, and curvature of field can be corrected favorable. Especially the curvature of field is excessively corrected by a normal retrofocus lens, but in this lens system the curvature of field becomes favorably corrected.

The second lens group with at least two positive lenses is desirable for achieving the required positive refractive power for correcting aberrations, achieving a suitable back focus and telecentric performance, and keeping the lens radii in a range that makes mass production possible. There is also the effect that an overall Gaussian-type arrangement can be used on the input side.

The third lens group with at least one positive lens positioned opposite to the screen side of the two cemented lenses for arranging the entire input side a Gaussian-type is also preferable, in addition for achieving the required positive refractive power for correcting aberrations, for achieving a suitable back focus and telecentric performance, and keeping the lens radii in a range that makes mass production possible. In addition, a Gaussian-type leads curvature of the lenses composing the third lens group limited, that is also effective to suppressing ghost, which is caused by reflection between surfaces of the light valve, such as a DMD, and the lenses.

Accordingly, by combining the projection lens system of the present invention and a light modulator, it is possible to provide a projector that stably produces clear images at low cost. In particular, since the projection lens system of the present invention is not susceptible to the effects of temperature, the lens system is suited to a rear projector in that a lens system is totally packaged.

It is preferable for a combined focal length f of the projection lens system and the focal length fL11 of the first lens closest to the screen to satisfy the following condition.

$$0 < |f/fL11| < 0.1 \quad (A)$$

By keeping the power of the first lens that is an aspherical lens within the range shown by the condition (A), the demands made on the surface precision of the first lens can be suppressed. The effect of fluctuations in temperature on the aberration performance can also be reduced by limiting the refractive power of the aspherical lens. Therefore, a plastic lens which can be easily produced as an aspherical lens can be used as the first lens with a stable surface precision, and it is possible to provide a low-cost projection lens system. The performance fluctuation between the products of the projection lens system of this invention also becomes reduced. The lens system in the present invention, for compacting, can include the first lens with diameter around 50 mm and sufficient surface precision using a plastic lens by suppressing the refractive power of the first lens within the range in equation (A) above.

It is also preferable for a combined focal length f of the projection lens system, a combined focal length f1 of the first lens group, a combined focal length f2 of the second lens group, and a combined focal length f3 of the third lens group to satisfy the following condition.

$$0.5 < |f1/f| < 1.5$$

$$1.0 < |f2/f| < 4.2$$

$$1.6 < |f3/f| < 3.5 \quad (B)$$

This condition stipulates the distribution of refractive power between the respective lens groups, and by satisfying the condition, it is possible to reduce the diameter of the first lens group, and in particular the diameter of the first lens that is an aspherical lens. Accordingly, the demands made regarding the molding and surface precision of the first lens can be suppressed, and a projection lens system with a favorable aberration performance can be provided at low cost.

Also, aside from cemented surfaces of the cemented lenses, it is preferable for a radius of curvature R of each lens composing the third lens group to satisfy the following condition $$0.005 < |1/R| < 0.06 \quad (C).$$

This condition can be rearranged to give $$16.667 < |R| < 200.$$

This condition ensures that prominent ghosts are not produced on the screen. In the projection lens system according to the present invention, the curvature of the lens surfaces composing the input side, that is part of Gaussian-type, is limited, so that this condition can be sufficiently satisfied. Accordingly, it is possible to provide a high performance lens system that has favorable performance for aberration correction and also does not produce ghosts.

BRIEF DESCRIPTION OF THE DRAWINGS

The aforementioned and other objects and advantages of the present invention will become apparent to those skilled in the art upon reading and understanding the following detailed description with reference to the accompanying drawings.

In the drawings.

DESCRIPTION OF THE PREFERRED EMBODIMENTS

First Embodiment

Figure 2:
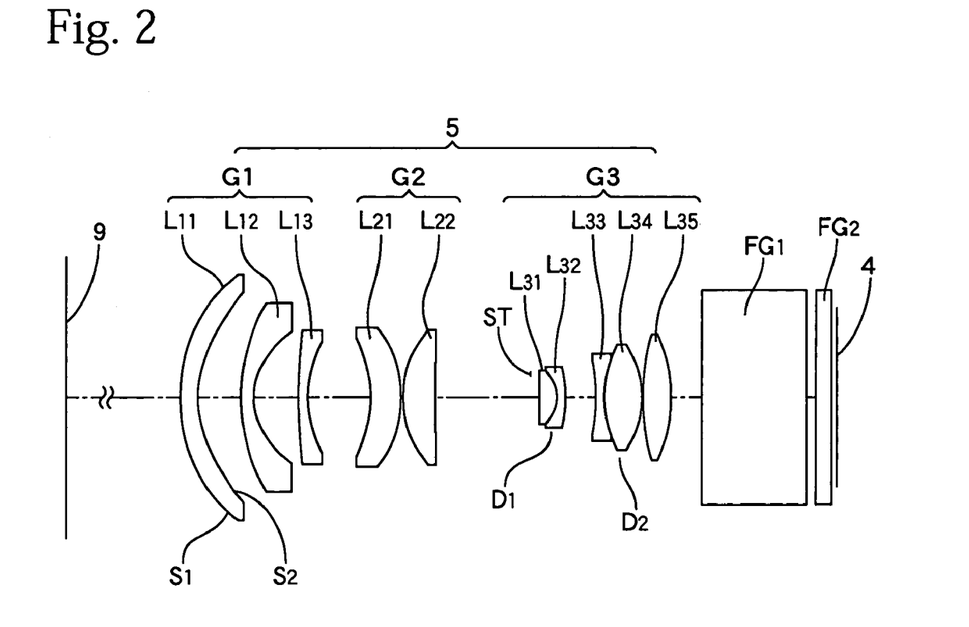
FIG. 2 shows an arrangement of a projection lens system according to the present invention.

FIG. 2 shows an arrangement of lenses in a projection lens system 5 according to the present invention. The projection lens system 5 of the present embodiment is constructed of ten lenses that are split into three lens groups G1, G2, and G3 from a screen 9 side (output side) to a light valve 4 side (input side). Parallel glasses FG1 and FG2 disposed between the projection lens system 5 and the light valve 4 are optical low-pass filters.

The first lens group G1 that is located closest to the screen 9 has an overall negative refractive power and is comprised of three negative meniscus lenses L11, L12, and L13 in order from the screen 9 side, such lenses being convex on the screen side. Both surfaces S1 and S2 of the first lens L11 are aspherical.

The second lens group G2 has an overall positive refractive power and is comprised of a positive meniscus lens L21 that is concave on the screen side and a convex lens L22 that is convex on the screen side. Also, the third lens group G3 has an overall positive refractive power and is comprised of a first cemented lens (a first doublet D1), in which a positive meniscus lens L31 that is concave on the screen side and a negative meniscus lens L32 that is concave on the screen side are cemented together, a second cemented lens (a second doublet D2), in which a bi-concave negative lens L33 and a bi-convex positive lens L34 are cemented together, and a bi-convex positive lens L35.

Accordingly, the projection lens system 5 is a retro-focus type lens system in which lens groups respectively with negative, positive, and positive refractive powers are arranged in that order from the screen side. Two cemented lenses D1 and D2 are also included in the third lens group G3. A positive lens L35 is disposed on an input side of the cemented lenses D1 and D2, and the positive second lens group G2 is disposed on the screen side of the cemented lenses D1 and D2. Accordingly, within the range of the second and third lens groups G2 and G3, although the spatial distances and individual lens sizes are different, the lens arrangement is similar to a symmetric Gaussian type.

Figure 3:
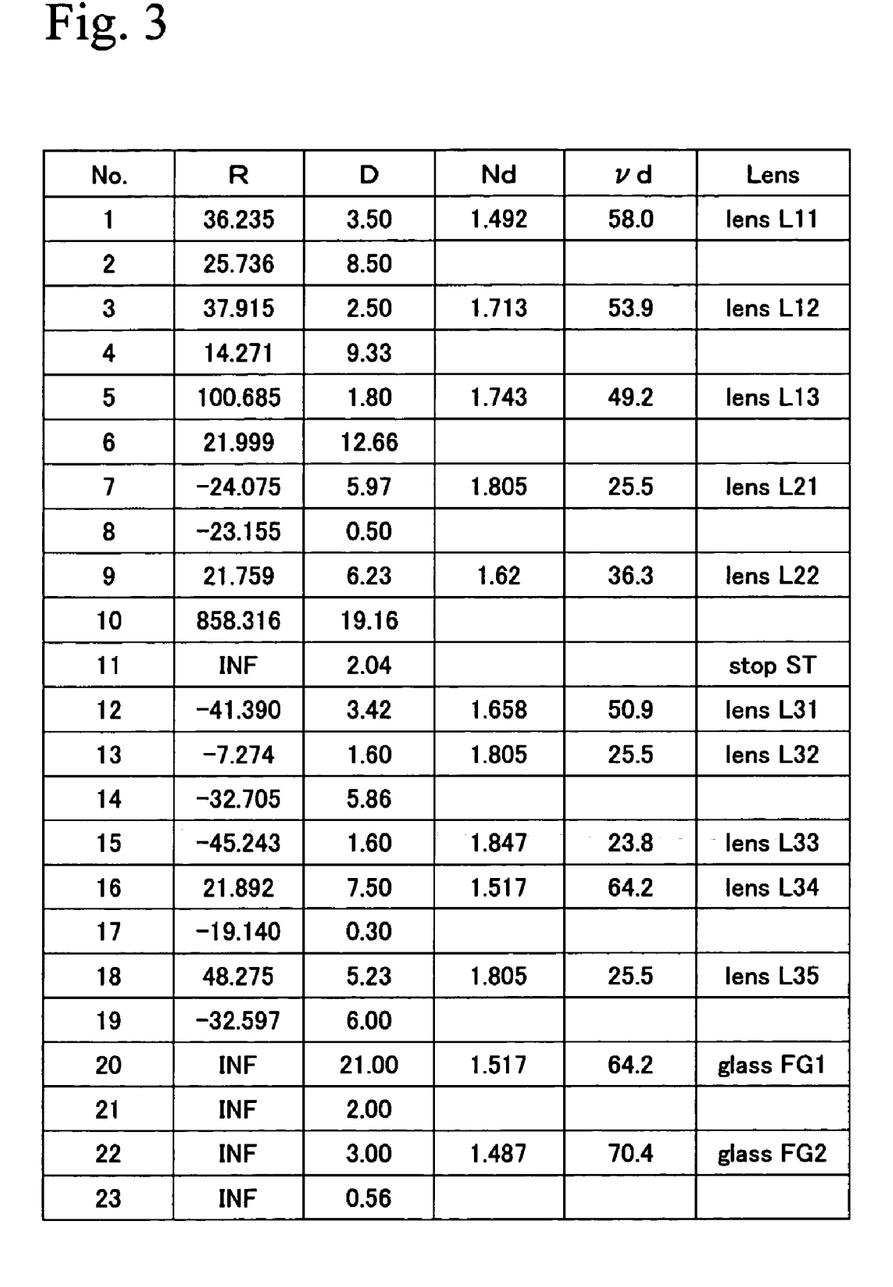
FIG. 3 shows lens data of the lens system shown in FIG. 2.

In the lens data shown in FIG. 3, "R(i)" (i is a number) represents the radius of curvature (mm) of each lens that is arranged in order from the screen side, "D(i)" represents the distance (mm) between the lens surfaces of the lenses arranged in order from the screen side, "Nd(i)" represents the refractive index (d line) of each lens arranged in order from the screen side, and "vd(i)" represents the Abbe number (d line) of each lens arranged in order from the screen side. "INF" represents a flat surface. This is also the case for the lens data in the other embodiments described later.

The first surface (S1) and second surface (S2) of the lens L11 are aspherical surfaces, and the aspherical coefficients are as follows.

The First Surface (S1)
R=36.235
K=0.0000
$A=7.5029\times10^{-6}$, $B=-1.3733\times10^{-8}$
$C=3.6649\times10^{-11}$, $D=-3.8674\times10^{-14}$ Here, if "X" represents a coordinate in the optical axis direction, "Y" represents a coordinate in a direction perpendicular to the optical axis direction, the propagation direction of light is set as positive, and "R" represents the paraxial radius of curvature, aspherical surfaces can be expressed by the following equation using the coefficients K, A, B, C, and D mentioned above.

$$X=(1/R)^2Y/[1+\{1-(1+K)(1/R)^2Y^2\}^{1/2}]+AY^4+BY^6+CY^8+DY^{10} \quad (1)$$

The Second Surface (S2)
R=25.736
K=0.0000
$A=4.2801\times10^{-7}$, $B=-1.6593\times10^{-8}$
$C=3.9601\times10^{-12}$, $D=-5.1873\times10^{-14}$ The various parameters of the projection lens system 5 of this embodiment are as follows.

Overall combined focal length f (mm): 10.0
First lens focal length fL11: −202.16
Combined focal length f1 of first lens group: −14.0 (f1/f=−1.4)
Combined focal length f2 of second lens group: 27.54 (f2/f=2.754)
Combined focal length f3 of third lens group: 21.78 (f3/f=2.178)
FNo.:2.6
Half-field angle (degrees): 40.24
Backfocus length (mm): 32.47

As can be understood from the numerical values shown above and in FIG. 3, the projection lens system 5 of the present embodiment satisfies the conditions (A), (B), and (C) stated above.

Figure 4:
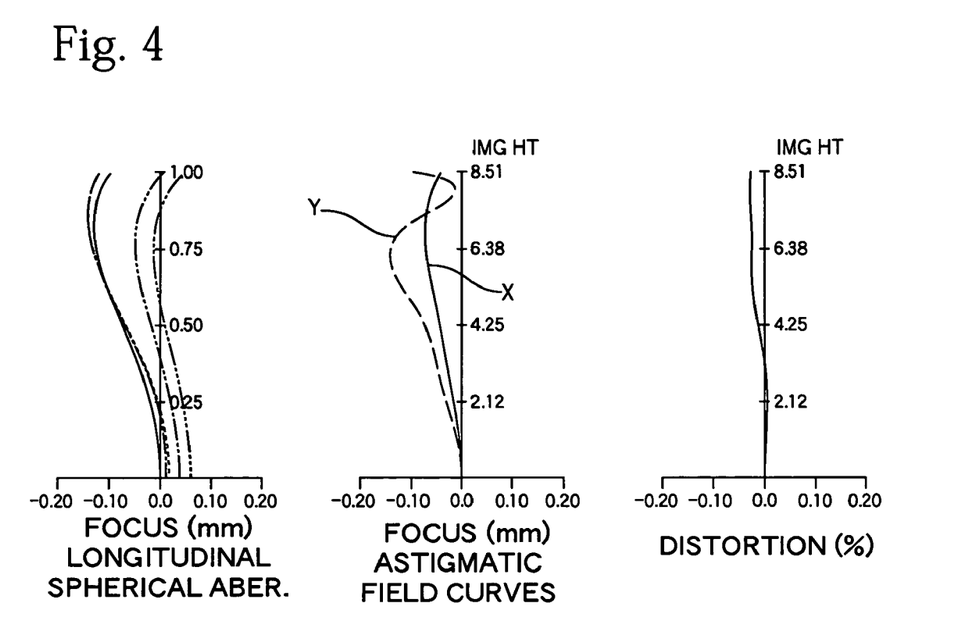
FIG. 4 shows various aberrations of the lens system shown in FIG. 2.

FIG. 4 shows the spherical aberration, astigmatism, and distortion of the projection lens system 5. Values of the spherical aberration are given for the respective wavelengths 670 nm (broken line), 650 nm (dot-dash line), 550 nm (solid line), 450 nm (dot-dot-dash line), and 430 nm (dot-dot-dot-dash line). As shown in the drawings, the longitudinal aberration of the projection lens system 5 of the present embodiment is kept within a range of around ±0.1 mm, and the distortion is kept within a range of around 0.03%. These levels of aberration are almost the same as or better than the various levels of aberration disclosed in Japanese Laid-Open Patent Publication No. 2002-31754 mentioned above as a reference document. Accordingly, it can be understood that with the projection lens system 5 of the present invention, by using only one aspherical lens, it is possible to obtain a lens system with favorable image forming performance that is the same level or better than that of a conventional lens system of the reference document in which three aspherical lenses are used.

In addition, with the lens system disclosed in Japanese Laid-Open Patent Publication No. 2002-31754, lenses which have radius of curvature of 200 mm or over and so is relatively easily generating ghost is used as a lens on the input side. On the other hand, with the projection lens system 5 of the present embodiment, the various aberrations are sufficiently reduced using a combination of lenses where the radius of curvature is 200 mm or less and a range of differences of curvature of lenses is within a relatively small about 20 to 50 mm. This is also one of the reasons of obtaining a lens system with an even more favorable image forming performance using fewer aspherical lenses.

With an F number of 2.6, the lens system is extremely bright. A sufficient field angle is obtained for enlarging and projecting, and the back focus is also sufficiently long. This means that the projection lens system of the present embodiment is a bright, wide-angle lens system with sufficient telecentric performance on the incident side. Accordingly, the lens system is suited to an apparatus that enlarges and projects images formed on a light valve 4 implemented by a liquid crystal panel or a DMD. In addition, the only aspherical lens is the lens L11 disposed at a position closest to the screen and furthest from the light source, which is also a source of heat, so that there is little fluctuation in the image forming performance due to changes in temperature. Also, since one aspherical lens is sufficient, neither the cost of producing the lenses nor the permitted error for assembly is especially problematic. Therefore, according to the present invention, it is possible to provide a projection lens system that has high performance at low cost.

In particular, since the conditions (A) and (B) mentioned above are satisfied, it is possible to relax the demands made regarding the surface precision of the first lens that is an aspherical lens. Accordingly, temperature fluctuations have little effect on aberration performance, and there is the advantage that by using a plastic lens which can be easily produced as an aspherical lens, it is possible to include an aspherical lens with a stable surface precision. Therefore, it is possible to provide a low-cost projection lens system where there is little difference between individual lens systems and which is relatively unaffected by temperature fluctuations. This means that the lens system 5 can stably achieve a sufficiently high image forming performance even when the system is provided in an enclosed environment together with a light source that is also a source of heat as in the rear projector 1 shown in FIG. 1. Accordingly, by enclosing the projection lens system 5 of the present embodiment together with the light source 3 and the light valve (light modulator) 4 inside the housing 2, it is possible to provide a low-cost rear projector 1 that can stably achieve high image quality.

Second Embodiment

Figure 5:
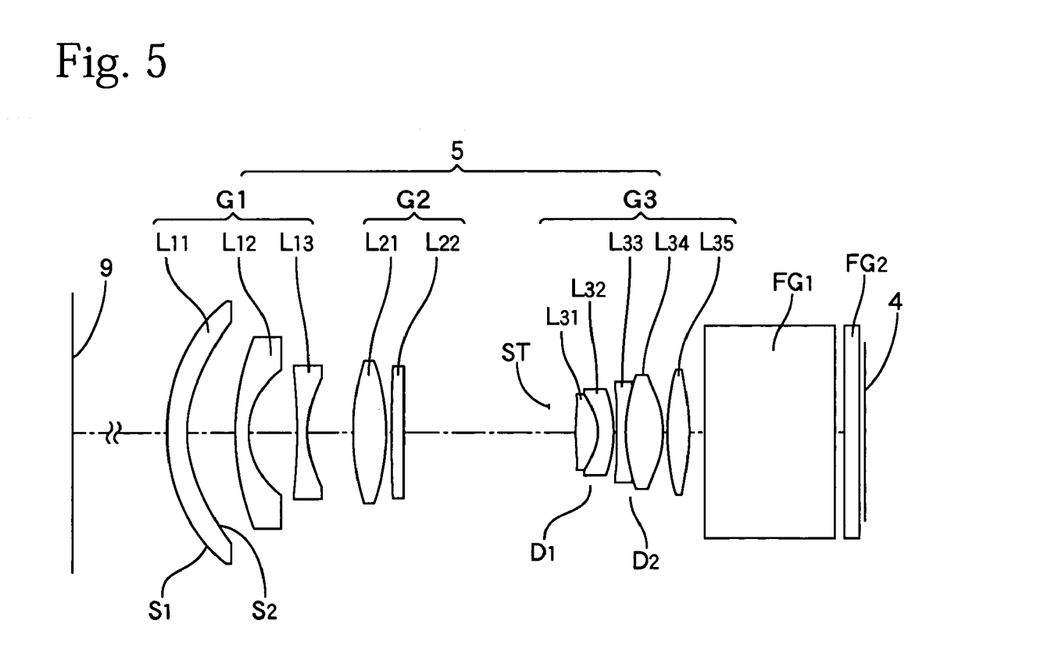
FIG. 5 shows an arrangement of another projection lens system according to the present invention.

FIG. 5 shows an arrangement of lenses in a different projection lens system 5 according to the present invention. The projection lens system 5 of the present embodiment includes a first lens group G1 with a positive refractive power and second and third lens groups G2 and G3 with negative refractive powers that are aligned from the screen 9 side towards the input side, with the third lens group G3 including two cemented lenses D1 and D2.

To describe the lens construction in more detail, the first lens group G1 positioned closest to the screen side has an overall negative refractive power and in order from the screen 9 side has a three-lens construction comprised of negative meniscus lenses L11 and L12 that are convex on the screen side and a negative biconcave lens L13. In the projection lens system 5 of the present embodiment also, both surfaces S1 and S2 of the first lens L11 are aspherical.

The second lens group G2 has an overall positive refractive power and is comprised of a bi-convex lens L21 and a positive meniscus lens L22 that is slightly convex on the screen side. Also, the third lens group G3 has an overall positive refractive power and is comprised of a first cemented lens (a first doublet D1) in which a bi-convex positive lens L31 and a negative meniscus lens L32 that is concave on the screen side are cemented together, a second cemented lens (a second doublet D2) in which a bi-concave negative lens L33 and a bi-convex positive lens L34 are cemented together, and a positive, bi-convex lens L35.

Accordingly, this projection lens system 5 is also constructed of a total of ten lenses and is a retrofocus lens system in which lens groups with negative, positive, and positive refractive powers are disposed in order from the screen side. In addition, the third lens group G3 is comprised of two cemented lenses D1 and D2, on an input side of which a positive lens L35 is disposed and on a screen side of which a positive second lens group G2 is disposed. Accordingly, when looking just at the range of the second and third lens groups G2 and G3, although the spatial distances and individual lens sizes are different, the lens arrangement is similar to a symmetric Gaussian type.

Figure 6:
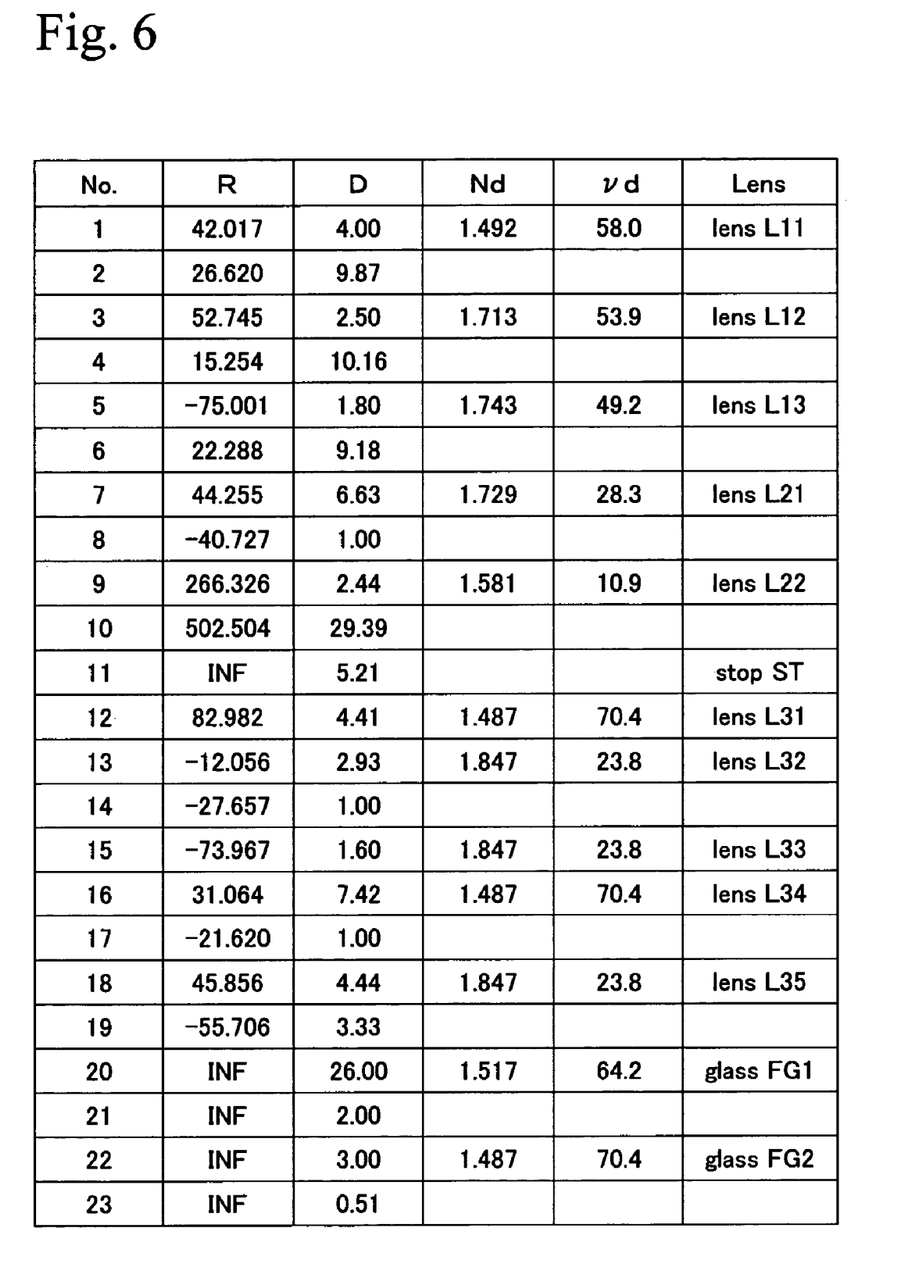
FIG. 6 shows lens data of the lens system shown in FIG. 5.

FIG. 6 shows lens data of the projection lens system 5 of the present embodiment. The first surface (S1) and second surface (S2) are aspherical surfaces, and the aspherical coefficients are as follows.

The First Surface (S1)
R=42.017
K=0.0000
A=6.7483×10$^{-6}$, B=−4.2768×10$^{-9}$
C=1.0696×10$^{-11}$, D=−8.9440×10$^{-15}$ The Second Surface (S2)
R=26.620
K=0.0000
A=−1.2306×10$^{-6}$, B=−1.8078×10$^{-8}$
C=−1.4377×10$^{-15}$, D=−1.9929×10$^{-14}$ The various parameters of the lens system 5 of this embodiment are as follows.
Overall combined focal length f (mm): 7.39
First lens focal length fL11: −160.94
Combined focal length f1 of first lens group: −9.63 (f1/f=−1.3)
Combined focal length f2 of second lens group: 29.0 (f2/f=3.9)
Combined focal length f3 of third lens group: 22.43 (f3/f=3.0)
FNo.:2.4
Half-field angle (degrees): 42.3
Backfocus length (mm): 34.8

As can be understood from the numerical values shown above and in FIG. 6, the projection lens system 5 of the present embodiment satisfies the conditions (A), (B), and (C) above.

Figure 7:
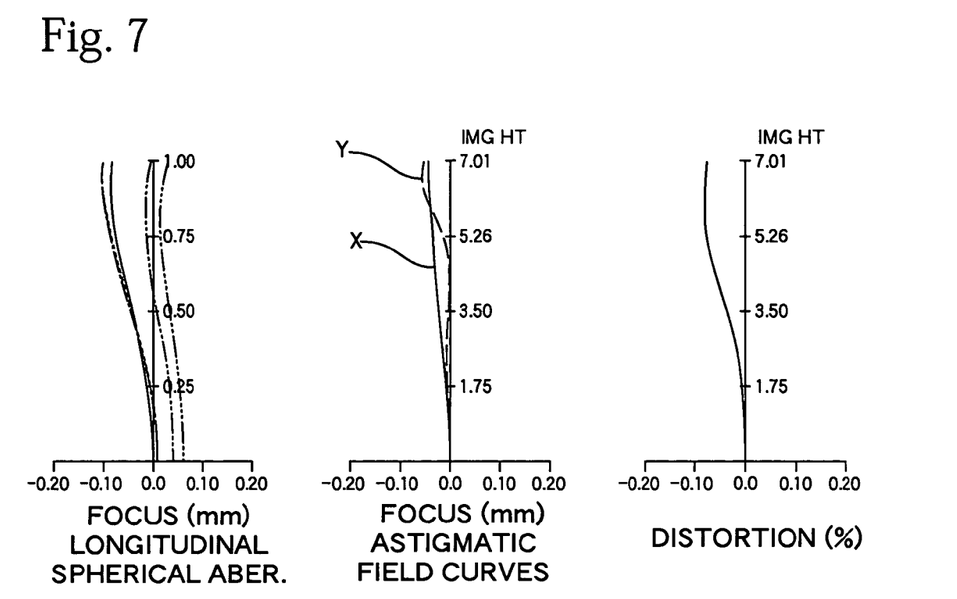
FIG. 7 shows various aberrations of the lens system shown in FIG. 5.

FIG. 7 shows the spherical aberration, astigmatism, and distortion of this projection lens system 5. As shown in the drawing, the longitudinal aberration of the projection lens system 5 of the present embodiment is kept within a range of around ±0.1 mm, and the distortion is kept within a range of around 0.1%. Accordingly, with the projection lens system 5 of the present embodiment, by using only one aspherical lens, it is possible to obtain a lens system that can sufficiently correct aberration and has high image forming performance at low cost. Like the lens system of the first embodiment described above, there is little fluctuation in the curvature of the individual lenses composing the third lens group on the incident side, which reduces a possibility of generating ghost.

In addition, the projection lens system 5 of the present embodiment has an F number of 2.4 and so is even brighter. With a half-field angle of 42.3 degrees, the lens system 5 has a large field angle, while at 34.8 mm, the back focus is even longer. Accordingly, the projection lens system of the present embodiment is an extremely bright, wide-angle lens system with even more favorable telecentric performance on the incident side. The lens system is therefore even further suited to enlarging and projecting images formed on a light valve 4 constructed of a liquid crystal panel or a DMD. Since aberration can be sufficiently corrected using only one aspherical lens, it is possible to achieve a stable image forming performance with little fluctuation in the performance due to temperature changes or assembly/fabrication errors.

Third Embodiment

Figure 8:
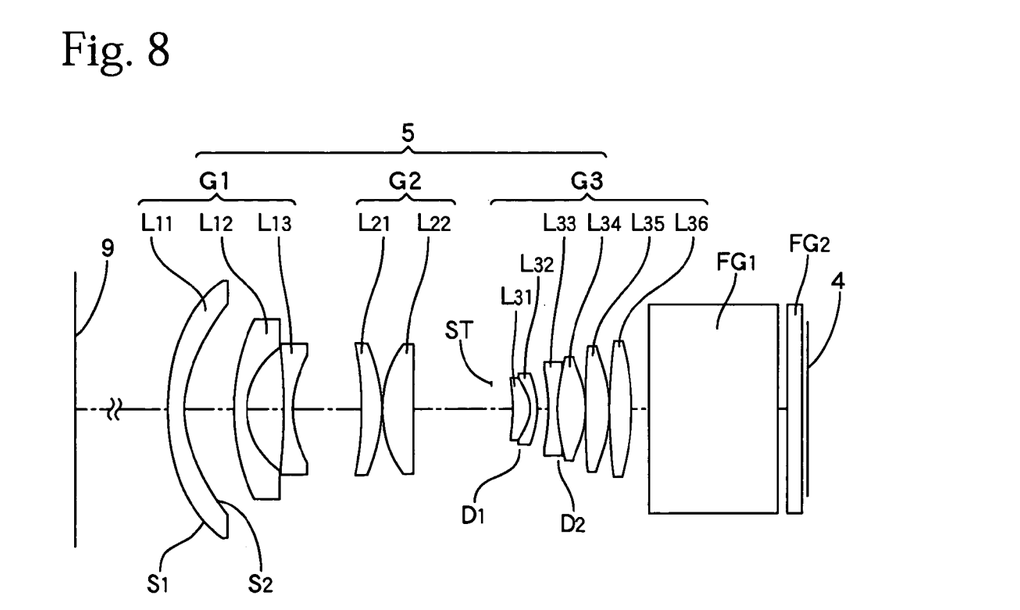
FIG. 8 shows an arrangement of yet another projection lens system according to the present invention.

FIG. 8 shows an arrangement of lenses in yet another projection lens system 5 according to the present invention. The projection lens system 5 of the present embodiment also includes a first lens group G1 with a positive refractive power and second and third lens groups G2 and G3 with a negative refractive power that are aligned from the screen 9 side towards the input side, with the third lens group G3 including two cemented lenses D1 and D2.

To describe the lens construction in more detail, the first lens group G1 positioned closest to the screen side has an overall negative refractive power and has a three-lens construction comprised in order from the screen 9 side of negative meniscus lenses L11 and L12 that are convex on the screen side and a negative bi-concave lens L13. In the projection lens system 5 of the present embodiment also, both surfaces S1 and S2 of the first lens L11 are aspherical.

The second lens group G2 has an overall positive refractive power and is comprised of a positive meniscus lens L21 that is concave on the screen side and a positive bi-convex lens L22. The third lens group G3 has an overall positive refractive power and is comprised of a first cemented lens (a first doublet D1) in which a positive meniscus lens L31 that is concave on the screen side and a negative meniscus lens L32 that is concave on the screen side are cemented together, a second cemented lens (a second doublet D2) in which a bi-concave negative lens L33 and a bi-convex positive lens L34 are cemented together, and positive bi-convex lenses L35 and L36.

Accordingly, this projection lens system 5 is constructed of a total of eleven lenses and is a retrofocus type lens system in which lens groups with negative, positive, and positive refractive powers are disposed in order from the screen side. In addition, the third lens group G3 is comprised of two cemented lenses D1 and D2, on an input side of which two positive lenses L35 and L36 are disposed and on a screen side of which the second lens group G2 composed of two lenses with a positive refractive power is disposed. Accordingly, when looking just at the range of the second and third lens groups G2 and G3, although the spatial distances and individual lens sizes are different, the lens arrangement is even more symmetric and so is closer to a Gaussian type arrangement.

Figure 9:
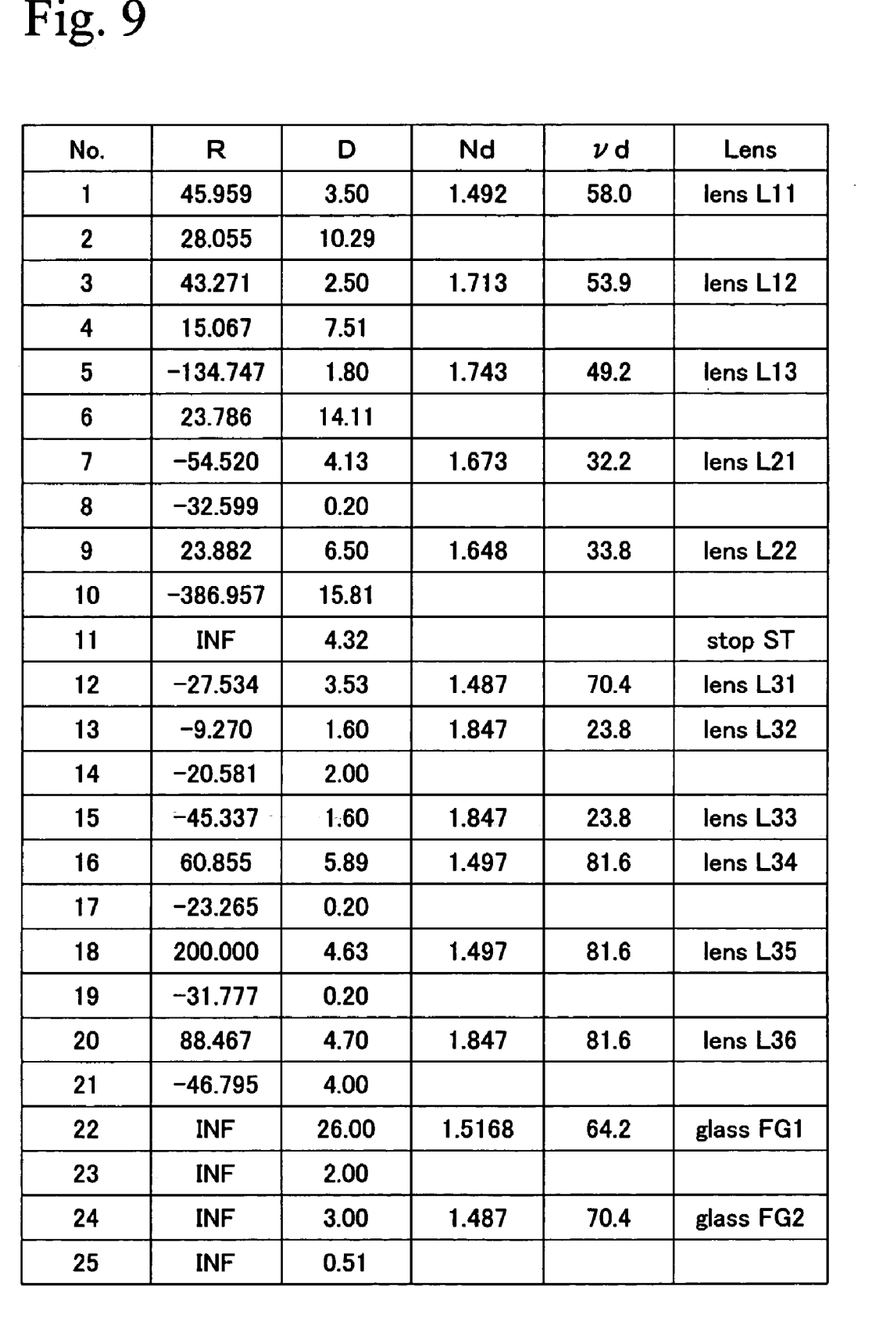
FIG. 9 shows lens data of the lens system shown in FIG. 8.

FIG. 9 shows lens data of the projection lens system 5 of the present embodiment. The first surface (S1) and second surface (S2) are aspherical surfaces, and the aspherical coefficients are as follows.

The First Surface (S1)
R=45.959
K=0.0000
A=$5.4701 \times 10^{-6}$, B=$-7.3336 \times 10^{-10}$
C=$8.3226 \times 10^{-13}$, D=$2.5513 \times 10^{-15}$ The Second Surface (S2)
R=28.055
K=0.0000
A=$-8.7300 \times 10^{-7}$, B=$-1.7054 \times 10^{-8}$
C=$1.714 \times 10^{-11}$, D=$-2.4659 \times 10^{-14}$ The various parameters of the lens system 5 of this embodiment are as follows.
Overall combined focal length f (mm): 9.2
First lens focal length fL11: −155.91
Combined focal length f1 of first lens group: −11.407 (f1/f=−1.24)
Combined focal length f2 of second lens group: 25.93 (f2/f=2.82)
Combined focal length f3 of third lens group: 22.74 (f3/f=2.47)
FNo.:2.4
Half-field angle (degrees): 43.52
Backfocus length (mm): 35.5

Figure 10:
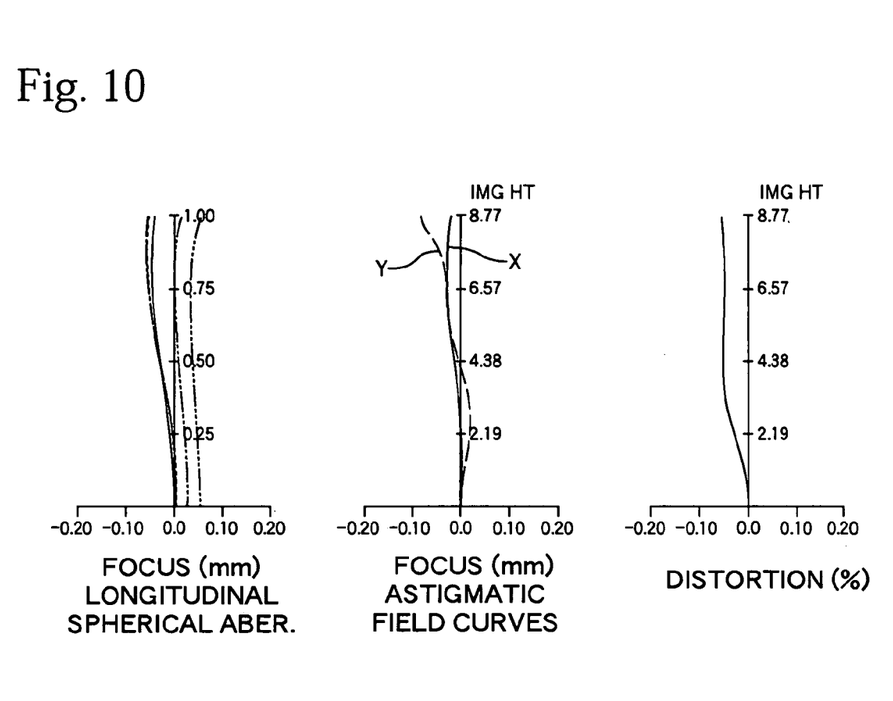
FIG. 10 shows various aberrations of the lens system shown in FIG. 8.

FIG. 10 shows the spherical aberration, astigmatism, and distortion of this projection lens system 5 of this embodiment. As shown in the drawing, the longitudinal aberration of the projection lens system 5 of the present embodiment is kept within a range of ±0.1 mm or less, and distortion is also kept within a range of around 0.1%. Accordingly, with the projection lens system 5 of the present embodiment, by using only one aspherical lens, it is possible to obtain a lens system that can correct aberration even more favorably. Also, although there is a slight increase in fluctuations in the curvature of the individual lenses composing the third lens group on the incident side, such increase dose not cause generating ghost. This means that it is possible to provide a lens system in which various aberrations are favorably corrected and where, like the previous embodiments, ghost is not generated.

In addition, the projection lens system 5 of the present embodiment is also bright with an F number of 2.4, has a larger field angle with a half field angle of around 43.5, and has an even longer back focus of 35.5 mm. Accordingly, the lens system is an extremely bright wide-angle lens with even more favorable telecentric performance on the incident side. Therefore, the lens system is even more suited to enlarging and projecting images in a rear projector 1 in which images are formed by a light valve 4 constructed of a liquid crystal panel or a DMD. Also, aberration can be sufficiently corrected using only one aspherical lens. By satisfying the conditions (A) and (B) stated above, a reduced correction load is placed on the aspherical lens. This means that there is little fluctuation in performance due to temperature changes and assembly/fabrication errors, so that it is also possible to achieve a stable image forming performance in a closed environment, such as the rear projector 1. Therefore, according to the present invention, it is possible to provide a low-cost projection lens system that is suited to a rear projector 1.

As described above, the projection lens system of the present invention includes the negative first lens group, the positive second lens group, and the positive third lens group of a first cemented lens, a second cemented lens, and a positive lens, so that aberrations such as distortion are corrected with few aspherical lenses and a high-performance, low-cost lens system is provided. The one of preferable embodiment of this invention is the projection lens system uses an aspherical lens as the lens closest to the screen in the first lens group.

By achieving a favorable balance in refractive power among the first lens group, the second lens group, and the third lens group, a lens system that is wide angle, has a long back focus, and is suited to a telecentric optical system is provided. A reduced correction load is placed upon the aspherical lens, which makes the lens system suited to mass production. Therefore, according to the present invention, it is possible to provide a low-cost projection lens system that achieves a sufficiently high correcting performance for various aberrations using fewer, in the above embodiment only one, aspherical lens. Since the number of aspherical lenses in the lens system according to the present invention is limited, there is little fluctuation in image forming performance due to temperature changes, and the lens system is suited to use in a closed environment, such as a rear projector. This means that the lens system of the present invention can be said to be a suitable lens system for the low-cost realization of a rear projector with high image quality.

What is claimed is:

1. A projection lens system that projects projected light from a light modulator to a screen, comprising in order from a screen side:
    a first lens group with a negative refractive power;
    a second lens group with a positive refractive power; and
    a third lens group with a positive refractive power including at least two cemented lenses and a lens with a positive refractive power positioned on an opposite side of the cemented lenses to the screen side, and
    wherein a first lens positioned closet to the screen side in the first lens group is an aspherical lens.

2. A projection lens system according to claim 1,
    wherein a focal length f of the projection lens system and a focal length fL11 of the first lens satisfy the following condition $0<|f/fL11|<0.1$.

3. A projection lens system according to claim 1,
    wherein a focal length f of the projection lens system, a focal length f1 of the first lens group, a focal length f2 of the second lens group, and a focal length f3 of the third lens group satisfy the following conditions $0.5<|f1/f|<1.5$, $1.0<|f2/f|<4.2$, and $1.6<|f3/f|<3.5$.

4. A projector comprising a projection lens system according to claim 1 and the light modulator.

5. A projection lens system that projects projected light from a light modulator to a screen, comprising in order from a screen side;
    a first lens group with a negative refractive power;
    a second lens group with a positive refractive power; and
    a third lens group with a positive refractive power including at least two cemented lenses and a lens with a positive refractive power positioned on an opposite side of the cemented lenses to the screen side, and
    wherein aside from cemented surfaces, a radius of curvature R of each lens comprising the third lens group satisfies the following condition $0.005<|1/R|<0.06$.

6. A projector comprising a projection lens system according to claim 5 and the light modulator.

* * * * *

UNITED STATES PATENT AND TRADEMARK OFFICE
CERTIFICATE OF CORRECTION

| | | |
|---|---|---|
| PATENT NO. | : 7,057,825 B2 | Page 1 of 1 |
| APPLICATION NO. | : 10/766510 | |
| DATED | : June 6, 2006 | |
| INVENTOR(S) | : Kiwamu Kobayashi | |

It is certified that error appears in the above-identified patent and that said Letters Patent is hereby corrected as shown below:

Col. 11

Line 24 – Change "closet" to --closest --.

Signed and Sealed this

Twelfth Day of September, 2006

JON W. DUDAS
*Director of the United States Patent and Trademark Office*